3,154,266
AIRCRAFT CONTROL SYSTEM
Thomas W. Sheppard and Ben E. Amsler, Silver Spring, Md., assignors to the United States of America as represented by the Secretary of the Navy
Filed Jan. 18, 1954, Ser. No. 404,820
9 Claims. (Cl. 244—14)

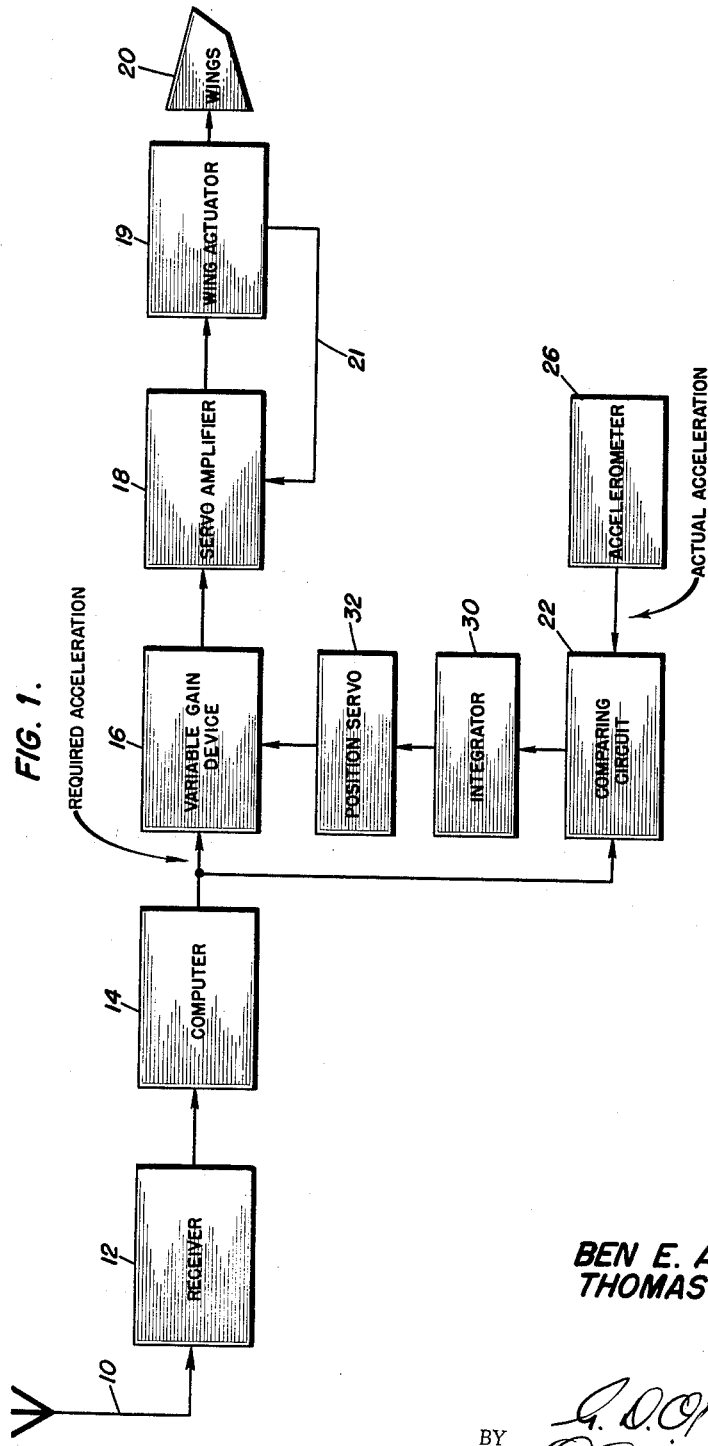

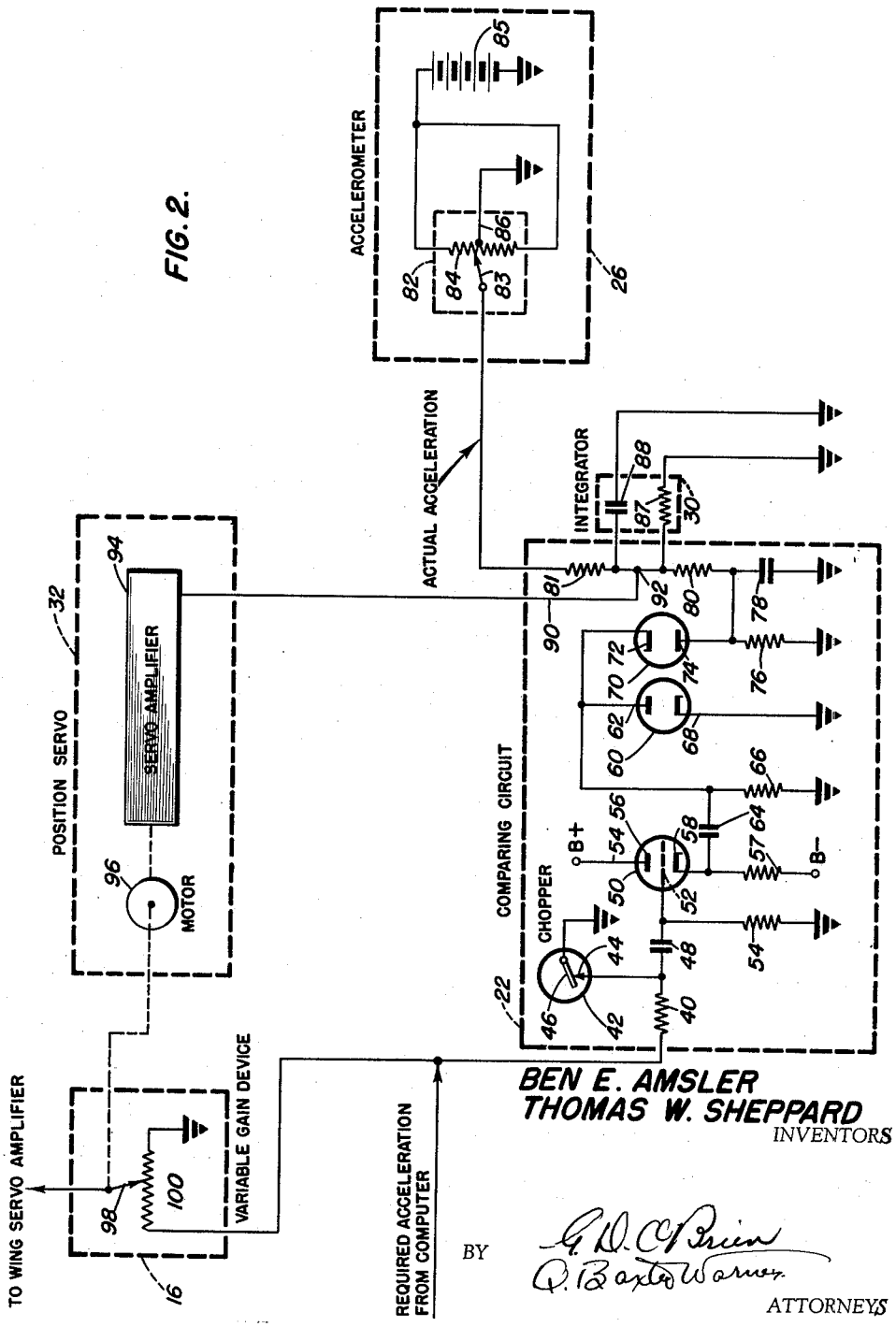

This invention relates to a control system for aerial vehicles. In more detail it relates to a steering control system for a guided missile.

In one form of guidance system a missile is guided to intercept a target by being constrained to ride the axis of a radar beam which is tracking the target. The basic beam rider intelligence is furnished from a conically scanned pulsed radar beam, whose pulse repetition rate is frequently modulated. The guidance equipment on the missile receives and processes the guidance intelligence contained in the beam to provide steering control signals. This guidance equipment includes means for converting angular errors with respect to the beam axis to linear displacement error with respect to said axis and means for producing control signals, representing accelerations, which are fed to electromechanical servo systems driving the steering wings. The control signals produced in this manner actuate the steering wings to bring the missile onto the beam axis.

The effectiveness of the steering wings of a missile varies throughout missile flight. That is, the acceleration produced by a given wing deflection depends on factors which vary during missile flight. Among the factors which affect wing effectiveness are changes in air density as the missile changes altitude, changes in missile velocity as the propellant is expended, and changes in missile weight and the location of the missile's center of gravity. It is therefore desirable to provide a variation of the sensitivity of the missile control system in accordance with the variation of wing effectiveness so that the same acceleration toward beam axis is always produced for a given off beam error signal derived by the missile guidance equipment.

In prior steering control systems the means for varying the sensitivity included a pressure probe which measured static pressure thus making it possible to provide compensation for altitude changes. In addition, a programmed variation of sensitivity was used to compensate for the other parameters which partly determine wing effectiveness. The programmed variation was computed for average Mach number variation, as determined from previous missile flights. Inasmuch as wing effectiveness is dependent on variables other than time and static pressure, this arrangement was unsatisfactory. Furthermore, the variation of sensitivity in accordance with a predetermined program hampers the missile beam riding ability, particularly in the event of evasive maneuvers by a target. The requirement of a pressure probe also introduces problems, such as handling, air flow stoppage and icing of the probe.

It is an object of the present invention to provide means for assuring that a steering wing will give the same lateral acceleration to the missile for a given error signal regardless of the position of the missile along its trajectory.

A further and more specific object of the invention is to provide means for changing the sensitivity of the missile control system during flight to compensate adequately for changing aerodynamic conditions encountered by the missile.

In accordance with the present invention the amplification of the steering control signal, derived from the guidance beam by means of a computer, is adjusted in accordance with the ratio of required or "called for" acceleration, as determined by the computer, to the acceleration actually produced. As will become obvious, the invention is not limited by the precise way in which the "called for" acceleration is derived from the guidance beam. Any suitable conventional receiver-computer combination may be utilized, as for example, the apparatus disclosed by Wirkler in U.S. Patent No. 2,548,278. To accomplish the objects of this invention, an accelerometer is used to measure the actual missile acceleration which is compared with the required acceleration, as derived by the computer. Any difference between actual acceleration and required acceleration provides an error signal which is used to adjust amplification of the signal from the computer. In practice, the invention includes means for averaging required acceleration and produced acceleration so that the system functions to make the average accceleration as measured by an accelerometer equal to the average acceleration called for by the guidance computer. In other words, the control system of the invention operates on the principle that the output of the computer represents the command or "called for" acceleration required for the missile to reach beam center while the actual acceleration can be measured by an accelerometer located near the center of gravity of the missile, and by comparing the average absolute values of the "called for" and "actual" accelerations, information is provided which is used for adjusting a sensitivity changing device.

These and other objects will become apparent when considered in connection with the accompanying drawings, in which:

FIG. 1 is a block diagram of the control system of the present invention; and

FIG. 2 is a circuit diagram of a portion of the control system shown in FIG. 1.

Referring to the drawings, and first to FIG. 1 thereof, the missile steering control system of the present invention is shown as comprising a missile-borne antenna 10 which receives signals from a guidance radar (not shown). The guidance radar transmits intelligence to the missile-borne equipment illustrated in FIG. 1, which will enable that equipment to steer the missile to intercept a target. One form of guidance system, known as the beam rider, is described in detail in U.S. patent application Serial No. 162,902, filed May 19, 1950, now Patent No. 3,126,172, for Method and Apparatus for Remotely Controlling an Airborne Vehicle, by William C. Parkinson et al. In the beam rider system, the missile is roll stabilized and the guidance beam is a conically scanned pulse radar beam in which a reference point is established in the scan cycle so that both distance and direction from the axis of the guidance beam can be determined. An improved beam rider guidance system is described in U.S. patent application Serial No. 241,942, filed August 15, 1951, now Patent No. 3,000,597, for Rocket Propelled Missile, by Alfred J. Bell et al., in which the guidance beam is a conically scanned pulse radar beam in which the pulse repetition frequency is modulated during the scan cycle. The signal received at the missile is then both amplitude and frequency modulated. The amplitude modulation provides an indication of the angular distance the missile is off the axis of the cone of radar energy generated by the scanned beam and the frequency modulation provides a reference for determining the direction to beam axis. The control system of the present invention is applicable to any guidance system where the missile is guided on a target intercept path; however, the beam rider system is described as typifying systems to which it is applicable.

The antenna 10 feeds the energy in the radar beam to a beam rider receiver 12 which contains means for deriving a signal indicating distance and direction from the beam axis, known as the error signal. A typical beam rider receiver comprises a superheterodyne receiver that includes a detector and amplifier for the amplitude modulation present in the guidance beam, and a discriminator for detecting the frequency modulation of the pulse repetition rate. The detected frequency modulation signal is used as a reference in a comparator circuit which determines the relative phasing of the amplitude modulation and frequency modulation signals. The relative phasing of the two signals together with the amplitude of the signal derived from the amplitude modulation provides the error signal in terms of both distance and direction from beam axis. This information is resolved into components for steering in the pitch and yaw planes.

This error signal is supplied to the computer 14 which converts it into a D.C. voltage representing the acceleration required to bring the missile onto the beam axis. The computer 14 may also contain differentiating circuits for determining the rate of change of the error signal, so that path damping can be provided for the missile, and limits for the voltages representing acceleration required, thereby preventing the occurrence of signals representing accelerations of such magnitude as might cause destruction of the missile by aerodynamic forces. The D.C. output of the computer 14 representing the required or "called for" acceleration is fed through a variable gain device 16 to a servo system including an amplifier 18 and an actuator 19 for moving the missile wing 20. A feedback connection 21 is provided in the wing servo system. The wing actuator 19 may be any electromechanical device capable of being driven by the output of amplifier 18 to provide a proportional amount of mechanical motion of the wing 20.

The D.C. output of the computer representing the required or "called for" acceleration is also fed to a comparing circuit 22 where it is converted to suitable form so that it can be compared with the signal from an accelerometer 26. The latter is suitably mounted on the missile airframe to detect the actual acceleration produced by a given wing deflection and to provide a voltage proportional to the actual acceleration. The comparing circuit 22, which will be described in detail hereinafter, determines the relationship between the "called for" acceleration and the produced acceleration, which relationship is a measure of wing effectiveness as pointed out hereinabove. Any difference or error between the signal representing produced acceleration and the signal representing "called for" acceleration is fed to an integrator 30 having a relatively long time constant to smooth or filter the difference voltage. The voltage output from the integrator 30 is supplied to a position servo 32 or similar device, which functions to adjust the gain of the variable gain device 16 to change the amount of amplification of the signal fed to the wing servo. If the voltage from the computer representing the "called for" acceleration is greater than that from the accelerometer representing the produced acceleration, the amplification is increased. This compensates for the decreased wing effectiveness due to changing aerodynamic conditions. On the other hand, if the wing effectiveness has been increased, the accelerometer output voltage is greater than the computer output and the amplification factor is decreased accordingly. If desired, the signals from the computer and the accelerometer can be fed through suitable averaging circuits before being compared.

The details of the variable gain device 16 and the circuit for comparing computer output and accelerometer output are shown in FIG. 2. The computer output in the form of a varying D.C. voltage representing required acceleration is fed through a limiting resistor 40 to a voltage chopper 42 having a fixed contact 44 and a vibrating contact 46. The latter is connected to ground while the fixed contact is connected through blocking capacitor 48 to the grid 52 of triode 50 which is connected as a cathode follower. The grid 52 is returned to ground through resistor 54 and the plate 56 is connected to the positive terminal of a suitable source of plate current as indicated. A load resistor 57 is connected between cathode 58 and the negative side of the plate current supply. The output from the cathode 58 is supplied to the plate 62 of a diode 60 which functions as a D.C. clamper. An isolating network, including capacitor 64 and resistor 66, is inserted in the connection between cathode 58 and plate 62. The cathode 68 of the section 60 is connected to ground so that the output of this section is negative with respect to ground potential.

The plate 62 is directly connected to cathode 72 of a second diode 70, which functions as a rectifier. The rectified negative voltage appearing at plate 74 is filtered by the resistor and capacitor combination 76 and 78, respectively, one side of each of which is connected to ground. The filtered negative voltage is applied to one end of a voltage network consisting of resistors 80 and 81. The amplitude of this unidirectional voltage of negative polarity is proportional to the absolute magnitude of the required acceleration as determined by the computer.

The accelerometer 82, which is suitably mounted on the missile airframe so as to be subjected to accelerations produced by wing 20, has its output 83 connected to the other end of the voltage divider consisting of resistors 80 and 81. The accelerometer 82 is illustrated schematically as comprising an arm 83 which moves over a tapped resistor 84. Both ends of resistor 84 are connected to the positive terminal of a voltage source 85. The tap connection 86 is at ground potential so that the voltage appearing at the output of the potentiometer is always positive with respect to ground when the accelerometer is subjected to a force. The amplitude of this unidirectional voltage of positive polarity is proportional to the absolute magnitude of the actual missile acceleration.

The negative voltage representing required acceleration and the positive voltage representing actual acceleration produced are added in the network consisting of resistors 80 and 81 and then integrated with the resistor 87 and capacitor 88, which are chosen to provide a long time constant suitable to eliminate rapid variations in the signals, thus providing an average signal. A connection 90 provided at an intermediate point 92 in the network 80 and 81 applies the difference signal to an electronic servo amplifier 94 which is part of the position servo 32 for adjusting the variable gain device 16. The servo amplifier 94 provides the input to a servo motor 96 which is mechanically connected to the movable contact 98 of a potentiometer 100. As is shown, the voltage representing required acceleration is also supplied directly to the potentiometer 100. The motor 96 moves the contact 98 to vary the voltage representing required acceleration. The voltage determined by the setting of the potentiometer 100 is supplied to the servo amplifier 18 to drive the wing actuator 19. In this manner the amplification factor in the steering control system is adjusted in accordance with changing aerodynamic conditions as determined by the relationship between required acceleration and actual acceleration.

Obviously many modifications and variations of the present invention are possible in the light of the above teachings. It is therefore to be understood that within the scope of the appended claims the invention may be practiced otherwise than as specifically described.

What is claimed is:

1. A control system for use in steering an aerial vehicle on a target intercept path, comprising means on said vehicle for receiving guidance intelligence, means for converting said guidance intelligence into a signal representing the acceleration required to bring said vehicle onto the target path, steering wings on said aerial vehicle, means on said vehicle for providing a signal representing the acceleration actually produced by said steering wings, means for obtaining the difference between the signal representing required acceleration and that representing produced acceleration, means for adjusting the magnitude of the signal representing required acceleration in accordance with said difference between the signals representing required acceleration and that representing produced acceleration, and means for actuating said steering wings an amount proportional to the adjusted signal representing required acceleration.

2. A control system for use in steering an aerial vehicle on a target intercept path, comprising means on said vehicle for receiving guidance intelligence, means for converting said guidance intelligence into a signal representing the acceleration required to bring said vehicle onto the target path, steering wings on said aerial vehicle, means on said vehicle for providing a signal representing the acceleration actually being produced by said steering wings, means providing an output signal representing the difference between the required acceleration signal and the signal representing produced acceleration, variable gain means for adjusting the magnitude of the signal representing required acceleration, means controlling said variable gain means in accordance with the output of said difference means, and a servo system for actuating said steering wings an amount proportional to the adjusted magnitude of said required acceleration signal.

3. A control system for use in steering an aerial vehicle on a target intercept path, comprising means on said vehicle for receiving guidance intelligence, a computer for converting said guidance intelligence into a signal representing the acceleration required to bring said vehicle onto the target path, steering wings on said aerial vehicle, means on said vehicle for providing a signal representing the actual acceleration produced by said steering wings, means providing an output signal representing the difference between the required acceleration and the produced acceleration, means for averaging said difference output signal, variable means connected to said computer for adjusting the magnitude of the signal representing the required acceleration, means controllable by the averaged difference output signal for controlling said variable means, and means for actuating said steering wings an amount proportional to the adjusted signal representing required acceleration.

4. A control system for use in steering an aerial vehicle on a target intercept path, comprising means on said vehicle for receiving guidance intelligence, means for converting said guidance intelligence into a first signal representing the acceleration required to bring said vehicle onto the target path, steering wings on said vehicle, an accelerometer on said vehicle for providing a signal representing the acceleration produced by said steering wings, a comparing circuit to which the signal representing required acceleration and that representing produced acceleration are supplied to provide a difference signal, means for filtering said difference signal to obtain the time average difference signal; means for adjusting the magnitude of the signal representing acceleration in accordance with the time average difference signal, and means for actuating said steering wings an amount proportional to the adjusted required acceleration signal.

5. A control system as claimed in claim 4 wherein the accelerometer provides a signal in the form of a unidirectional voltage having one polarity, and said comparing circuit includes means for converting the signal representing required acceleration into a voltage of opposite polarity having an absolute magnitude proportional to said required acceleration, and means for adding said voltages.

6. A control system for use in steering an aerial vehicle on a target intercept path, comprising means on said vehicle for receiving guidance intelligence, means for converting said guidance intelligence into a signal representing the acceleration required to bring said vehicle onto the target intercept path, steering wings on said aerial vehicle, an accelerometer for providing a signal representing the acceleration actually produced by said wings in response to the signal representing required acceleration, means for comparing the signal representing required acceleration and that representing produced acceleration to provide a difference signal, means for obtaining the average value of said difference signal, variable gain means for controlling the magnitude of the signal representing required acceleration, means actuated by said average value of said difference signal for adjusting said variable gain means, and a servo system for actuating said wings an amount proportional to the adjusted required acceleration signal.

7. In a guided aerial vehicle including means thereon for deriving a steering signal from a beam of electromagnetic energy and means for actuating control wings in accordance with said steering signal; apparatus for compensating for variation in the wing effectiveness of said vehicle comprising, means for adjusting the magnitude of said steering signal, means for detecting the actual response of said vehicle to said steering signal, means for comparing the detected actual response with said steering signal to obtain the difference therebetween, means for averaging said difference, and means controllable by said average difference for actuating said magnitude adjusting means whereby the magnitude of said steering signal will be increased whenever the actual response of said vehicle is less than the response required by the steering signal, and the magnitude of said steering signal will be reduced whenever the actual response of said vehicle is greater than the response required by said steering signal.

8. In a guided aerial vehicle including means thereon for deriving a called-for acceleration steering signal from a beam of electromagnetic energy and means thereon for actuating steering wings in an amount proportional to said called-for acceleration steering signal; apparatus for compensating for variations in the wing effectiveness of said vehicle comprising, means for adjusting the magnitude of the called-for acceleration signal, said means adjusting the magnitude of the signal applied to said wing actuating means, an accelerometer on said vehicle for detecting the actual acceleration of said vehicle, means for obtaining the absolute value of said actual acceleration, means for obtaining the absolute value of said called-for acceleration, means for obtaining the difference between the absolute value of said actual acceleration and the absolute value of said called-for acceleration, and means for controlling said magnitude adjusting means in accordance with the difference between said absolute values whereby said magnitude will increase when said called-for acceleration exceeds said actual acceleration and said magnitude will decrease when said actual acceleration exceeds said called-for acceleration.

9. Apparatus as claimed in claim 8 with additionally means for obtaining the average value of said difference between said absolute values, and said means for controlling the magnitude of said called-for acceleration is controlled by said average value.

References Cited in the file of this patent
UNITED STATES PATENTS

| | | |
|---|---|---|
| 2,487,793 | Esval et al. | Nov. 15, 1949 |
| 2,548,278 | Wirkler | Apr. 10, 1951 |
| 2,627,384 | Esval | Feb. 3, 1953 |